(No Model.)
A. L. IDE, Dec'd.
A. F., F. P. & R. W. IDE, Executors.
COMBINED CRANK SHAFT AND DISK.
No. 601,965. Patented Apr. 5, 1898.
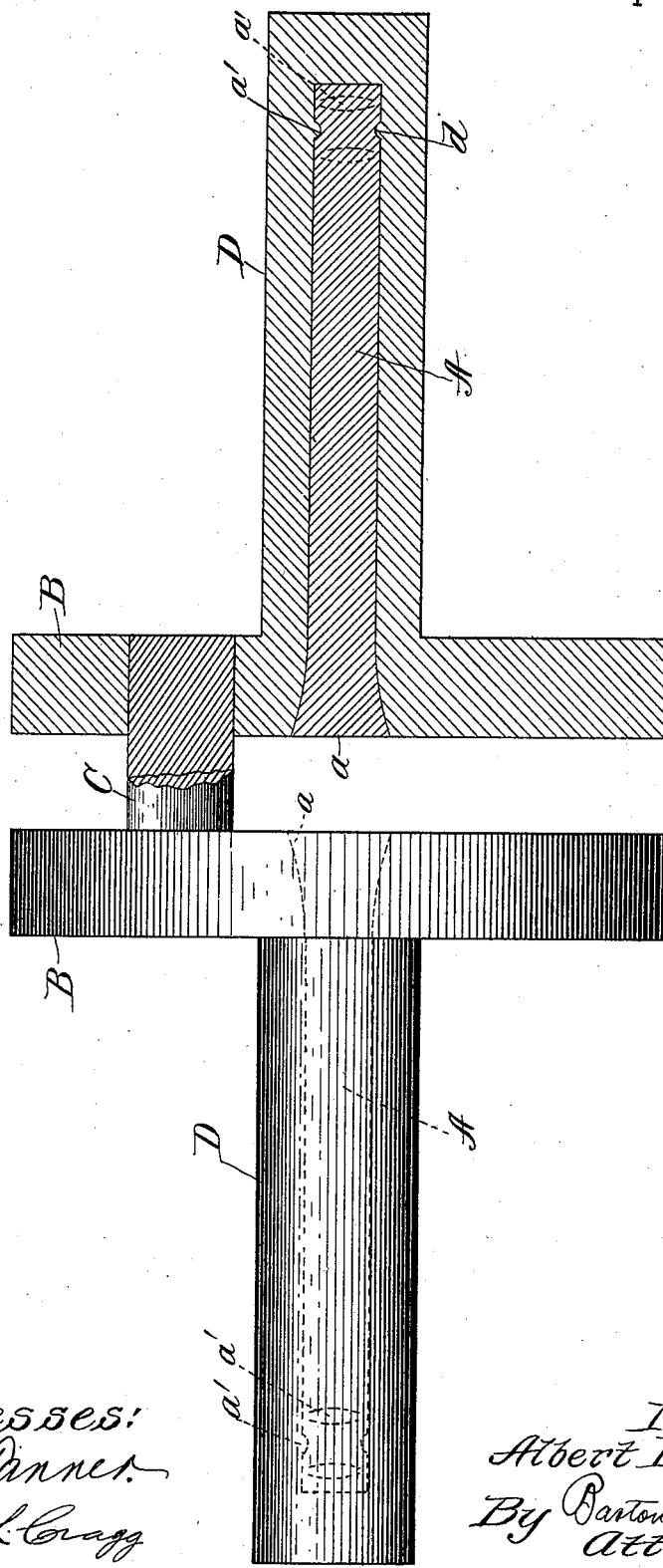

UNITED STATES PATENT OFFICE.

ALBERT L. IDE, OF SPRINGFIELD, ILLINOIS; ADDIE F. IDE, FRANCIS P. IDE, AND ROY W. IDE EXECUTORS OF SAID ALBERT L. IDE, DECEASED.

COMBINED CRANK SHAFT AND DISK.

SPECIFICATION forming part of Letters Patent No. 601,965, dated April 5, 1898.

Application filed February 1, 1897. Serial No. 621,467. (No model.)

*To all whom it may concern:*

Be it known that I, ALBERT L. IDE, a citizen of the United States, residing at Springfield, in the county of Sangamon and State of Illinois, have invented a certain new and useful Improvement in a Combined Crank Shaft and Disk, (Case No. 2,) of which the following is a full, clear, concise, and exact description, reference being had to the accompanying drawing, forming a part of this specification.

My invention relates to the manufacture of combined crank shafts and disks such as are being largely used in modern short-stroke and high-speed steam-engines.

Two forms of combined crank shafts and disks are well known in the art, one form in which the crank shafts and disks are formed in one integral casting and the other in which the disks are cast separately, shafts of wrought-steel being united with said disks. The combined shafts and disks of the first class have to be formed of cast-steel to give the requisite strength of union between the disks and shafts. This construction is very expensive, very liable to have flaws or defects, and shafts thus united with disks have frequently become broken at the place of junction therewith. The combined cast-metal disks and wrought-steel shafts are objectionable principally because of weakness in the disks and in the union between the shafts and crank-pins with the disks, and, secondarily, on account of the expense and time necessary in their manufacture. In modern high-speed engines the crank-pin has to be placed very close to the axis of the shaft, and in providing holes in the disks of the latter class of combined crank disks and shafts for the insertion of the crank-pins thin and weak webs have been left between said holes and the holes for the shaft, so that sufficient pressure could not be exerted upon the shafts nor upon the crank-pins to secure a stable union between the same and the disks because of the strain exerted upon the thin webs between the holds. In fact, with very short stroke engines it has been impossible to use a separate crank shaft and disk of cast metal because it sometimes happens that the hole for the crank-pin must be so near the center of the shaft as to encroach upon the diameter of the crank-shaft itself, thus leaving no web of supporting metal between the two holes.

I am enabled to overcome the defects and retain the advantages of both of the above well-known classes of combined crank shafts and disks by means of my invention.

My invention consists, generally speaking, of a crank-shaft having a disk carried upon an end thereof, said shaft and disk being formed in one integral casting with an interior strengthening rod or core of metal, preferably extending axially through the shaft and disk. In carrying out the invention the strengthening-core, preferably of wrought iron or steel, is properly supported in a mold and the metal poured or cast so as to form the disk and the shaft covering the core, which is preferably slightly flared at the disk end and scored at the opposite end. The core is preferably heated to a degree which will enable it to become fused with the molten cast metal poured about the same, so that a firm physical union will be established between the core and the surrounding cast portions. Blow-holes and other imperfections are also thus avoided.

I will explain my invention by reference to the accompanying drawing, which illustrates the application of my invention to a double-crank shaft.

In the drawing, A represents a strengthening-core, preferably of wrought-steel, which is flared at *a* and scored at *a'*. The disk B and exterior D are formed integral and securely united to the core by pouring metal around the latter, the flared and scored ends of the core further insuring firm engagement between the core and the surrounding cast metal, fillets *d*, of cast metal, forming in the core. After the disk and shaft exterior have been cast a hole is drilled therein, into which the crank-pin C, preferably of steel, may be driven with any pressure desired. Other means may be employed for securing the crank-pin in position. Two disks and shafts may be coupled by the crank-pin C, as shown, to form a double-crank shaft.

By reason of the firm integration between the wrought-iron core and the surrounding cast metal the crank-disk is practically a solid circular plinth, in which but a single hole need be formed for the reception of the crank-pin, which may be placed as close as is desired to the axis of the crank-shaft without weakening the union between the crank-shaft and the disk, and since there is no web of metal to withstand the pressure used in forcing the crank-pin into position the pressure may be increased to the desired extent to secure an absolutely firm engagement of the crank-pin with the disk.

By means of my invention the simplicity of construction of the completely cast shaft and disk is thus maintained, while its cost may be lessened, since other metal than cast-steel may be employed. The advantage of the unbreakable wrought-steel shaft is also secured, since the wrought-iron core enforces the union between the shaft and disk. In addition to gaining all of the advantages of each of the combined crank shafts and disks hitherto well known in the art and overcoming the defects of the same I am also enabled to manufacture my improved shaft and disk at an expense approximately one-half that of the combined cast disk and steel shaft.

Having thus described my invention, what I claim as new, and desire to secure by Letters Patent, is—

1. As a new article of manufacture, a strengthening rod or core of metal, and an engine crank shaft and disk formed in one integral casting about said rod or core, substantially as described.

2. As a new article of manufacture, the combination of an axially-disposed strengthening rod or core of metal, with a crank shaft and disk formed in one integral casting about said rod or core, substantially as described.

3. As a new article of manufacture, a wrought-iron rod or core, and an engine crank shaft and disk formed in one integral casting about said rod or core, substantially as described.

4. As a new article of manufacture, an engine crank shaft and disk formed in one integral casting, and a wrought-iron rod or core contained within said shaft and disk, said core being flared at the disk end and scored at the opposite end, substantially as described.

5. As a new article of manufacture, a strengthening rod or core of metal which is scored, and an engine crank shaft and disk formed in one integral casting about said rod or core, substantially as described.

In witness whereof I hereunto subscribe my name this 29th day of January, A. D. 1897.

ALBERT L. IDE.

Witnesses:
CHARLES A. BROWN,
GEORGE L. CRAGG.